US011183727B2

(12) United States Patent
Sugeno et al.

(10) Patent No.: US 11,183,727 B2
(45) Date of Patent: Nov. 23, 2021

(54) POWER SUPPLY APPARATUS

(71) Applicant: MURATA MANUFACTURING CO., LTD., Kyoto (JP)

(72) Inventors: Naoyuki Sugeno, Kyoto (JP); Kazumi Sato, Kyoto (JP); Masami Okada, Kyoto (JP); Yasuhiro Watanabe, Kyoto (JP); Ryo Tanabe, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 54 days.

(21) Appl. No.: 16/271,440

(22) Filed: Feb. 8, 2019

(65) Prior Publication Data
US 2019/0181406 A1 Jun. 13, 2019

Related U.S. Application Data

(63) Continuation of application No. PCT/JP2017/018947, filed on May 22, 2017.

(30) Foreign Application Priority Data

Aug. 10, 2016 (JP) .............................. JP2016-157234

(51) Int. Cl.
*H01M 50/20* (2021.01)
*H02J 3/32* (2006.01)
(Continued)

(52) U.S. Cl.
CPC ....... *H01M 50/20* (2021.01); *H01M 10/0525* (2013.01); *H01M 10/44* (2013.01);
(Continued)

(58) Field of Classification Search
CPC .... H01M 2/70; H01M 10/0525; H01M 10/44; H01M 10/441; H01M 50/20;
(Continued)

(56) References Cited

U.S. PATENT DOCUMENTS

2014/0327303 A1* 11/2014 Naganishi .............. H01R 11/32
307/10.1
2014/0333132 A1* 11/2014 Yamauchi ........... H01M 2/1077
307/18
2015/0147610 A1 5/2015 Conrardy et al.

FOREIGN PATENT DOCUMENTS

EP 2 800 229 11/2014
JP 2013038885 A 2/2013
(Continued)

OTHER PUBLICATIONS

International Search Report for Application No. PCT/JP2017/018947, dated Jun. 13, 2017.
(Continued)

*Primary Examiner* — Miriam Stagg
*Assistant Examiner* — Lilia Nedialkova
(74) *Attorney, Agent, or Firm* — K&L Gates LLP

(57) ABSTRACT

A power supply apparatus includes a container including a first conductive material, a plurality of battery racks including a second conductive material, a plurality of electricity storage modules mounted on the battery racks and having grounded portions connected to the battery racks, and a grounding means configured to connect the battery racks to a ground outside the container.

5 Claims, 7 Drawing Sheets

(51) Int. Cl.
   *H01M 10/44*      (2006.01)
   *H02J 3/38*       (2006.01)
   *H01M 10/0525*    (2010.01)
   *H02J 9/06*       (2006.01)

(52) U.S. Cl.
   CPC ............ *H01M 10/441* (2013.01); *H02J 3/32* (2013.01); *H02J 3/38* (2013.01); *H02J 9/061* (2013.01); *H01M 2220/10* (2013.01)

(58) Field of Classification Search
   CPC ........ H01M 2220/10; H02J 9/061; H02J 3/32; H02J 3/38; Y02E 60/10
   See application file for complete search history.

(56) References Cited

FOREIGN PATENT DOCUMENTS

| | | | |
|---|---|---|---|
| JP | 2013120694 | A | 6/2013 |
| JP | 2015122817 | A | 7/2015 |
| JP | 2016192828 | A | 11/2016 |

OTHER PUBLICATIONS

Extended European Search Report dated Mar. 3, 2020, in corresponding European Application No. 17839012.6.

\* cited by examiner

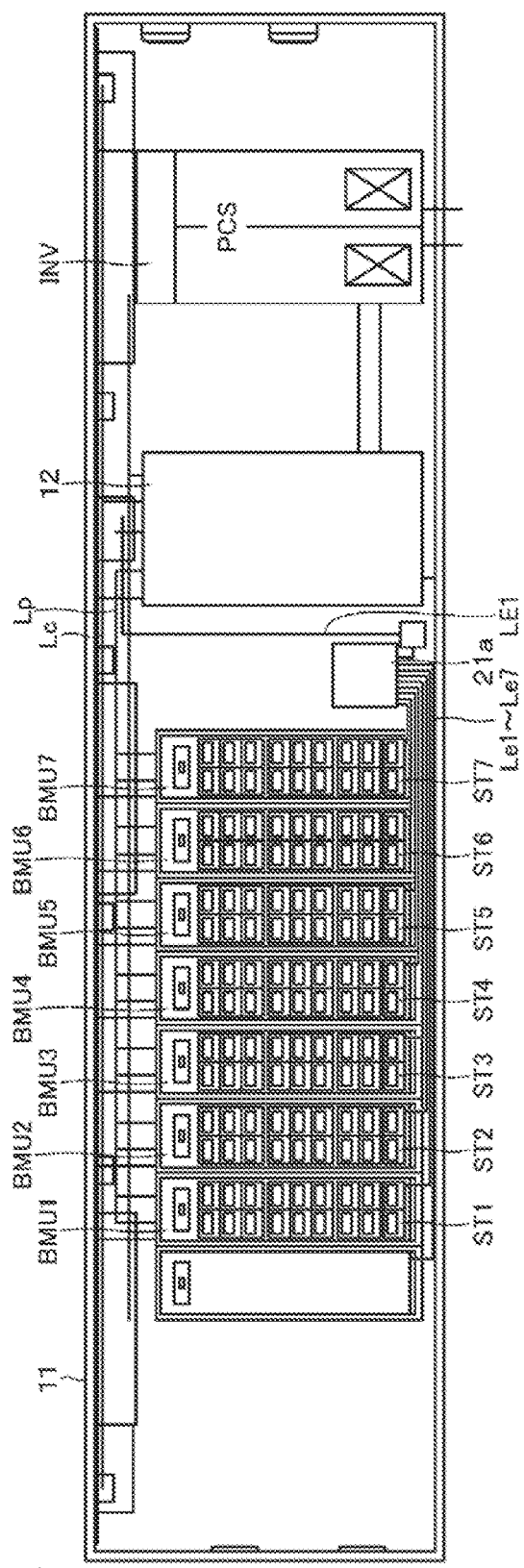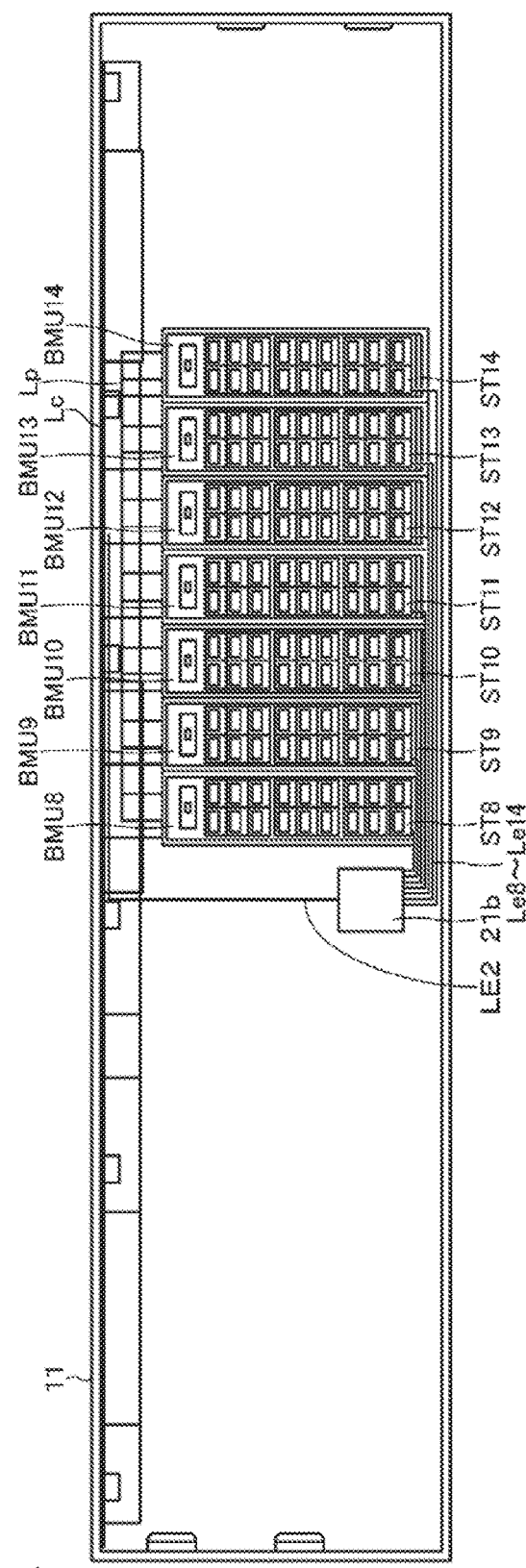
FIG. 4A
FIG. 4B

POWER SUPPLY APPARATUS

CROSS REFERENCE TO RELATED APPLICATIONS

The present application is a continuation of PCT patent application no. PCT/JP2017/018947, filed on May 22, 2017, which claims priority to Japanese patent application no. JP2016-157234 filed on Aug. 10, 2016, the entire contents of which are being incorporated herein by reference.

BACKGROUND

The present technology generally relates to a power supply apparatus using, for example, lithium ion secondary batteries.

It is known to construct an electricity storage system as a power supply apparatus by using a large number of electricity storage modules each having a plurality of unit batteries (also referred to as battery cells) connected in series. The electricity storage system can supply power to loads such as a lighting device in a factory at the time of a power failure and can be used for leveling power loads.

As an example of such an electricity storage system, there is provided a system (to be referred to as a container type electricity storage system as appropriate) in which a plurality of electricity storage modules is mounted on battery racks, and the battery racks on which the electricity storage modules are mounted, an AC/DC converter, a control unit, and the like are housed in a container.

An AC/DC converter is one of the constituent elements of an electricity storage system. The AC/DC converter is a circuit device having both the function of a converter for converting an alternate current into a direct current and the function of an inverter for generating an alternate current from a direction current. In the AC/DC converter, noise is often generated accompanying a switching operation for high power, and noise is generated in the power line. In the electricity storage system, in performing digital communication of a control signal, a control operation may not be performed normally due to the influence of noise generated in the AC/DC converter.

SUMMARY

The present technology generally relates to a power supply apparatus using, for example, lithium ion secondary batteries.

One of objects of the present technology is to provide a power supply apparatus that prevents electric shock and prevents control operation from being affected by noise generated in an AC/DC converter or the like.

According to an embodiment of the present technology, a power supply apparatus is provided. The power supply apparatus includes a container a first conductive material, a plurality of battery racks including a second conductive material, a plurality of electricity storage modules mounted on the battery racks and having grounded portions connected to the battery racks, and a grounding means configured to connect the battery racks to a ground outside the container.

According to at least one embodiment, the present technology is configured to insulate the container from the battery racks and connect the battery racks to a ground outside the container. This makes it possible to perform grounding independently from the AC/DC converter that becomes a noise source. Therefore, it is possible to prevent noise from propagating to an electricity storage module M via ground and malfunction due to the influence of noise.

In addition, because the grounded portion of the electricity storage module is connected to ground outside the container via the battery rack, it is possible to prevent floating capacitance from occurring and to prevent an electric shock even if a user mistakenly touches the electricity storage module.

It should be understood that each effect described herein is not necessarily limited and other suitable properties relating to the present technology may be realized and as further described.

BRIEF DESCRIPTION OF THE FIGURES

FIGS. 4A and 4B are schematic diagrams of the inner configuration of a container for explaining a configuration according to an embodiment of the present technique.

DETAILED DESCRIPTION

Embodiments described below are preferable specific examples of the present technology, and various technically preferable limitations are imposed on the embodiments. However, in the following description, the scope of the present technology is not limited to these embodiments, unless there is a statement that limits the present technology in particular.

Figure 1:
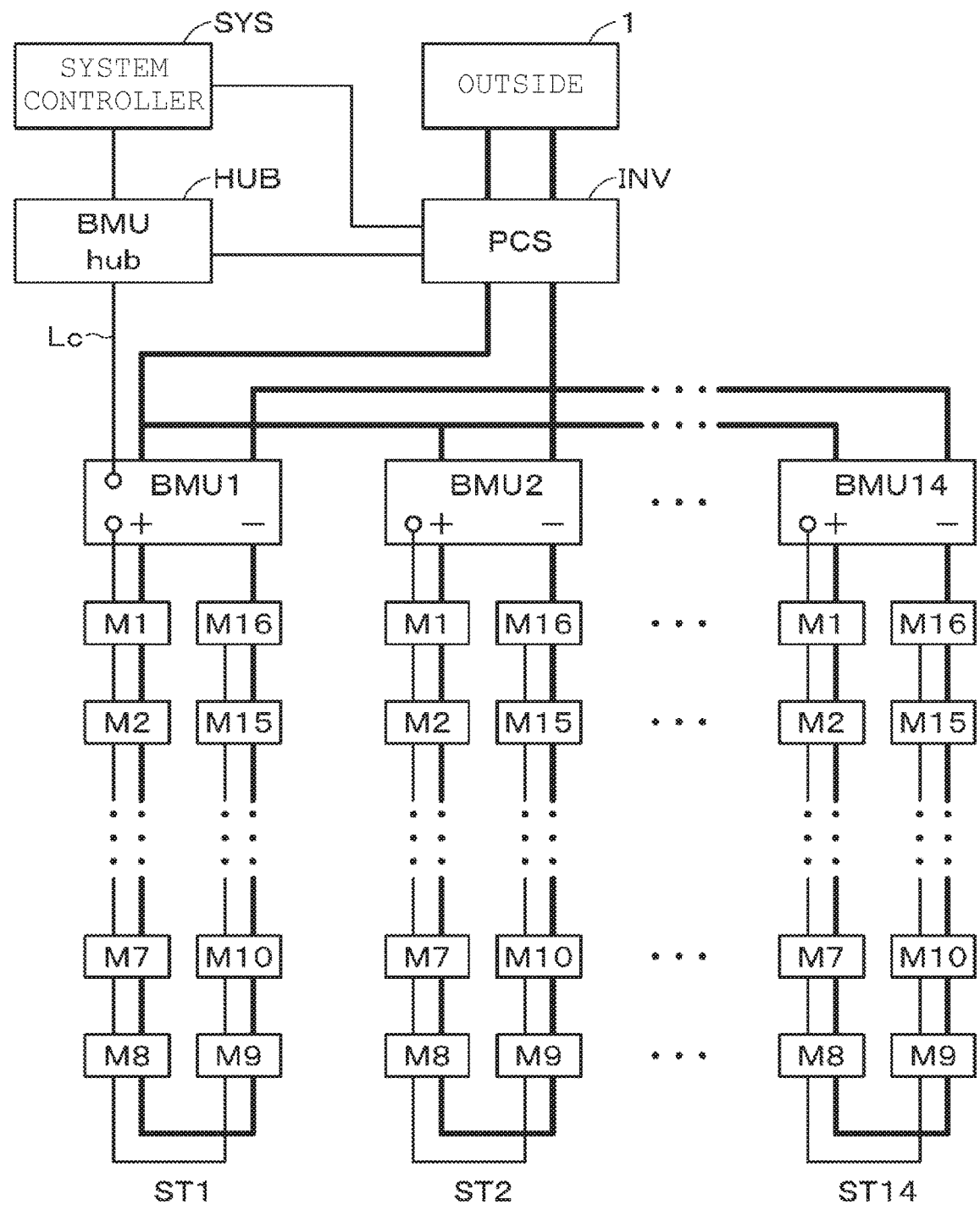
FIG. 1 is a block diagram of an embodiment of a system configuration according to an embodiment of the present technology.

FIG. 1 is a block diagram showing an example of the configuration of an electricity storage system according to one embodiment of the present technique. As shown in FIG. 1, the electricity storage system according to an embodiment of the present technology includes an electricity storage device including a plurality of electricity storage modules, for example, 16 electricity storage modules M1 to M16 and a battery management unit BMU, a concentrator (BMU hub) HUB connected to the plurality of battery management units BMU via communication wiring Lc that is a communication path, an AC/DC converter INV (Power Conditioning System), and a system controller SYS. The battery management unit BMU that is a common controller is provided for the electricity storage modules M1 to M16.

An electricity storage device including electricity storage modules M and the battery management unit BMU is referred to as a string ST. Note that 14 strings ST 1 to ST 14 connected in parallel are connected to the AC/DC converter INV. When it is unnecessary to distinguish each individual string, each string will be referred to as a string ST as appropriate. The number of electricity storage modules or strings and the connection form of strings are not limited to those described above, and various settings can be made.

The electricity storage modules M1 to M16 are connected in series. When it is unnecessary to distinguish each electricity storage module, each electricity storage module will be referred to as an electricity storage module M as appropriate. The connection form of the electricity storage modules M can be changed as appropriate. For example, two electricity storage modules connected in series may be connected in parallel, and eight parallel connections may be connected in series.

In the electricity storage system, the power of (16×7=112) electricity storage modules M is supplied to the AC/DC converter INV via DC power wiring (DC power bus), and power is supplied from the AC/DC converter INV to outside 1. In addition, power is supplied from the outside 1, and power for charging is supplied from the outside 1 to the electricity storage module M through a power line via the AC/DC converter INV. The outside 1 is a load, an AC power system and the like, and is set in accordance with the usage of the electricity storage system. For example, the outside 1 is a 400-V three-phase three-wire power line in a factory.

In the AC/DC converter INV, the DC power supplied from the electricity storage module M is converted to AC power and supplied to the outside 1. In the AC/DC converter INV, the AC power supplied from the outside 1 is converted into DC power and supplied to the electricity storage module M to charge the electricity storage module M.

Along with the power supply operation, communication complying with standards such as Recommended Standard 232 version C (RS-232C), RS-485, and Controller Area Network (CAN) is performed between the system controller SYS and the AC/DC converter INV and the concentrator HUB, between the concentrator HUB and the AC/DC converter INV, between the concentrator HUB and the battery management units BMU, between the battery management units BMU, and between the electricity storage modules M.

One example of the electricity storage module M includes an exterior case and a battery block or the like accommodated in the exterior case. For the exterior case, for example, it is desirable to use a material having high conductivity and emissivity. By using a material having high conductivity and emissivity, excellent heat dissipation properties in the exterior case can be obtained. By obtaining excellent heat dissipation properties, it is possible to suppress temperature rise in the outer case. Furthermore, the opening portion of the exterior case can be minimized or eliminated, and high dust and drip resistance can be achieved. A material such as aluminum or an aluminum alloy, copper, a copper alloy, or the like is used as the exterior case. This exterior case serves as the grounded portion of a charging module M.

For example, a plurality of (for example, 16) lithium ion secondary batteries are connected in parallel in a battery block. In the outer case, for example, a plurality of battery blocks is connected in series. The number of battery blocks and the connection form can be changed as appropriate. In addition, a power storage element such as a secondary battery other than a lithium ion secondary battery may be used. For example, assuming that the output voltage of each lithium ion secondary battery is 3.2 V, the output voltage of each electricity storage module is approximately 51.2 V (3.2 V×16). That is, the string ST including the N (N=1 or more of an integer) electricity storage modules M can supply a voltage of approximately 51.2×N (V).

The battery management unit BMU that is a high-order common controller is provided for a plurality of electricity storage modules M. The battery management unit BMU collects data from each electricity storage module M. That is, the battery management unit BMU acquires data concerning the voltage, State Of Charge (SOC), charging current, discharge current, and battery temperature of each battery cell of the battery unit of each electricity storage module M by communication. The electricity storage module M and the battery management unit BMU perform bidirectional communication complying with a standard such as I2C, System Management Bus (SMBus), Serial Peripheral Interface (SPI), or Controller Area Network (CAN), which is a serial communication standard. Communication may be wired or wireless.

The battery management unit BMU controls charge permission or charge prohibition of the plurality of electricity storage modules M. For example, the battery management unit BMU receives a command from the concentrator HUB by communication, and controls charge permission or charge prohibition. For example, the battery management unit BMU transmits a charge permission command to the electricity storage module M for which charge permission is determined. Upon receiving the charge permission command, the electricity storage module M turns on a charging switch element. However, when conditions of overcharge or the like of the battery are satisfied, the charging switch element is turned off. The electricity storage module M that has received no charge permission command turns off the charging switch element.

The electricity storage module M has a battery unit having a plurality of lithium ion secondary batteries serially connected. Cell balance control is performed on each lithium ion secondary battery. The electricity storage module M further includes a voltage detection unit for detecting the voltage between the terminals of the battery unit, a temperature detection unit for detecting the temperature of the battery unit, and a current detection unit. The detected voltage, temperature, and current are converted into digital data and supplied to a battery monitor.

The battery monitor monitors the digital voltage data and the digital temperature data to monitor the presence or absence of abnormality of the battery. For example, when the voltage indicated by digital voltage data is a voltage serving as a criterion for overcharge or a voltage serving as a criterion for overdischarge, an abnormality notification signal indicating the presence or possibility of an abnormality. The battery monitor also generates an abnormality notification signal when the temperature of the battery or the temperature of the entire electricity storage module M is higher than a threshold value. In addition, the battery monitor monitors digital current data. When the current value indicated by digital current data is larger than a threshold value, the battery monitor generates an abnormality notification signal. The abnormality notification signal generated by the battery monitor is transmitted to the battery management unit BMU by the communication function of the battery monitor.

The battery monitor monitors the presence or absence of the above-mentioned abnormality and transmits digital voltage data and digital current data to the battery management unit BMU by communication. Further, the battery management unit BMU and the concentrator HUB communicate with each other to transmit the voltage data, current data, temperature data, and the like of each electricity storage module M to the concentrator HUB.

The battery management unit BMU includes switches such as a Module controller Unit (MCU), a charge switch, and a discharge switch. The MCU is constituted by a Central Processing Unit (CPU) or the like having a communication function and the like and controls each electricity storage module M. For example, when an abnormality notification signal is supplied from the battery monitor, the battery management unit BMU notifies the concentration device HUB of the abnormality by using the communication function. In response to this notification, for example, the concentrator HUB sends a command to the battery management unit BMU by communication and appropriately performs control on the string ST such as stopping charging or discharging.

The battery management unit BMU and the concentrator HUB are connected to each other via the communication wiring Lc. The plurality of battery management units BMU and the electricity storage module M are connected to each other via the communication wiring Lc. As the communication wiring Lc, CAN, RS 232C, RS 485, or the like is used.

The concentrator HUB communicates with the battery management unit BMU and monitors the states of a plurality of strings ST (a plurality of electricity storage modules M). Further, the concentrator HUB notifies the system controller SYS and the AC/DC converter INV of the state of the plurality of strings ST (the plurality of electricity storage modules M). In addition, the concentrator HUB receives commands from the system controller SYS and the AC/DC converter INV by communication and gives a command to the battery management unit BMU by communication to control the battery management unit BMU. Note that the concentrator HUB may have a control function and monitor and control a plurality of strings ST (a plurality of electricity storage modules M).

The concentrator HUB holds, for example, connection information such as the number of strings ST connected in series, the number of strings ST connected in parallel, the total number of strings ST connected to each other, the number of electricity storage modules M of each string connected in series and/or the number of electricity storage modules M of each string connected in parallel, the number of the electricity storage modules M connected to each other. This connection information is set, for example, by an operator (user) who operates the user interface ((UI), not shown) of the concentrator HUB or sends connection information from the system controller SYS to the concentrator HUB.

The concentrator HUB may hold the electricity storage module information associated with the present voltage, current, temperature, and the like of each electricity storage module M. The electricity storage module information is acquired by, for example, the concentrator HUB communicating with the battery management unit BMU.

In the electricity storage system according to one embodiment of the present technology, the concentrator HUB communicates with each of the battery management units BMU to monitor whether the voltage of each string ST has reached a predetermined voltage (a voltage lower than the upper limit voltage by a predetermined voltage or a voltage lower than the lower limit voltage by a predetermined voltage). In order to reduce a string power value that has reached a predetermined voltage to ½ or ¼ of a rated current value I, the concentrator HUB communicates with each battery management unit BMU and issues a current value change instruction. The battery management unit BMU that has received the instruction from the concentrator HUB controls to change the current value flowing through the string ST. As a result, a current value is limited.

In the electricity storage system according to one embodiment of the present technology described above, the power consumption of the load connected to the outside 1 is monitored, and when the power load becomes large, the output power of the electricity storage module is supplied to the load, in addition to power from a system power, so as to level the power load. In addition, when a power failure occurs in the system, the system power is cut off and power is supplied from the electricity storage module to the load.

Figure 2A:
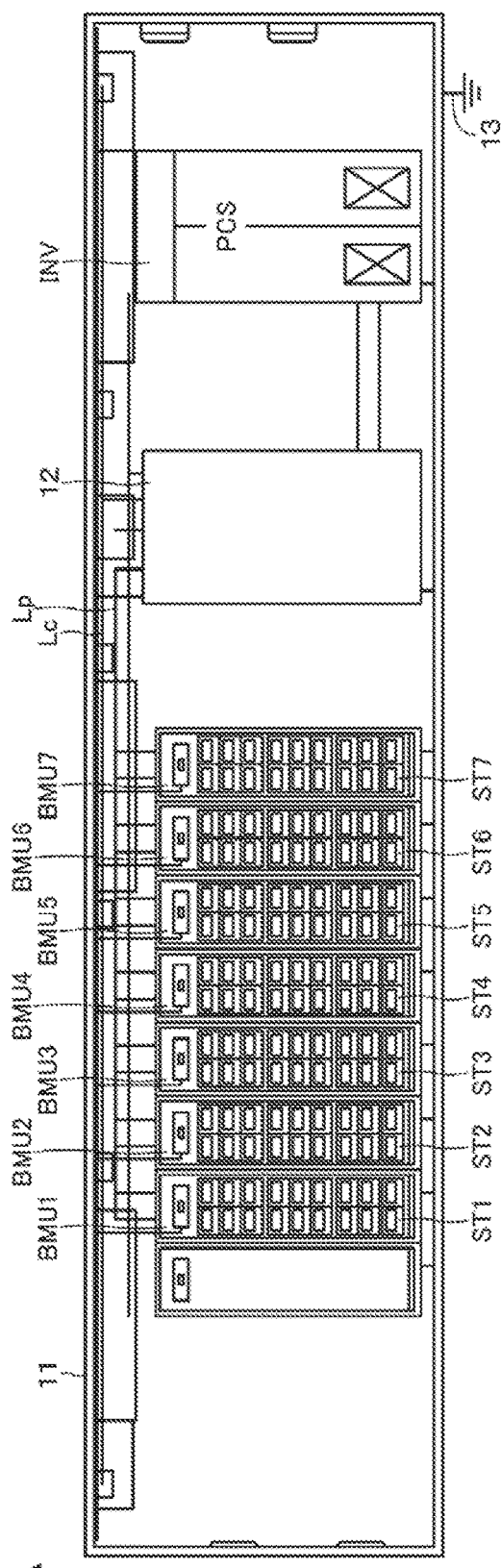
FIGS. 2A and 2B are schematic diagrams of the inner configuration of a container for explaining a conventional configuration.
Figure 2B:
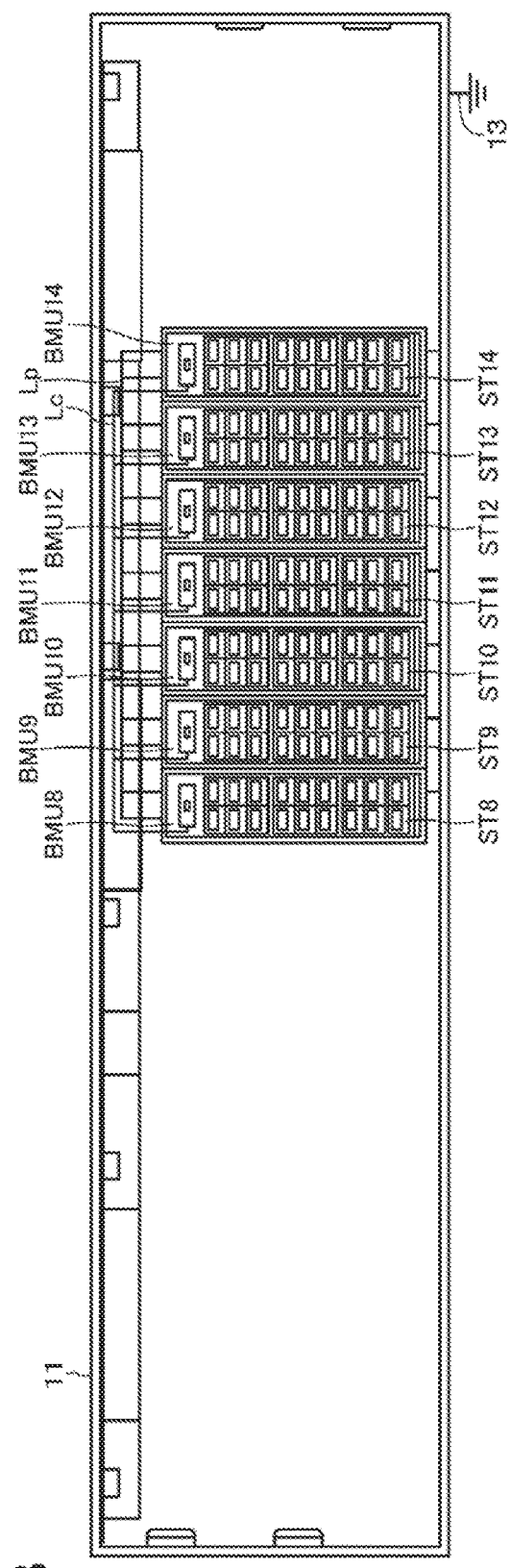

The electricity storage system described above is housed in a container (for example, a metal box having a length of 40 feet). For easier understanding of the present technology, the configuration of a conventional container type electricity storage system will be described with reference to FIGS. 2 and 3. FIG. 2 shows the interior of the container type electricity storage system having a conductive container 11 divided into two parts by a longitudinal division line. There is a passage of a width that allows a person to walk in the center of the container type electricity storage system, and the configuration shown in FIG. 2A and the configuration shown in FIG. 2B face each other across this passage.

Strings ST1 to ST7 are provided on the side shown in FIG. 2A, and strings ST8 to ST14 are provided on the opposite side shown in FIG. 2B. One string ST has a configuration in which the battery management unit BMU and (2×8=16) electricity storage modules M are housed in a metal battery rack. The plurality of battery racks can be mechanically and electrically coupled to each other. The AC/DC converter INV, the DC input/output board 12, and the like are housed in the container 11.

A wiring duct is provided on the ceiling portion of the container 11. DC power wiring Lp, the communication wiring Lc, and the like are passed through this wiring duct. The container 11 is connected to ground via a grounding means 13. The electricity storage module M of each string ST is placed on the shelf board of the battery rack and is electrically connected to the shelf board. The battery rack of each string ST is electrically connected to the container 11 and is grounded via the container 11. The AC/DC converter INV and a DC input/output board 12 are also electrically connected to the container 11 and grounded via the container 11.

Figure 3:
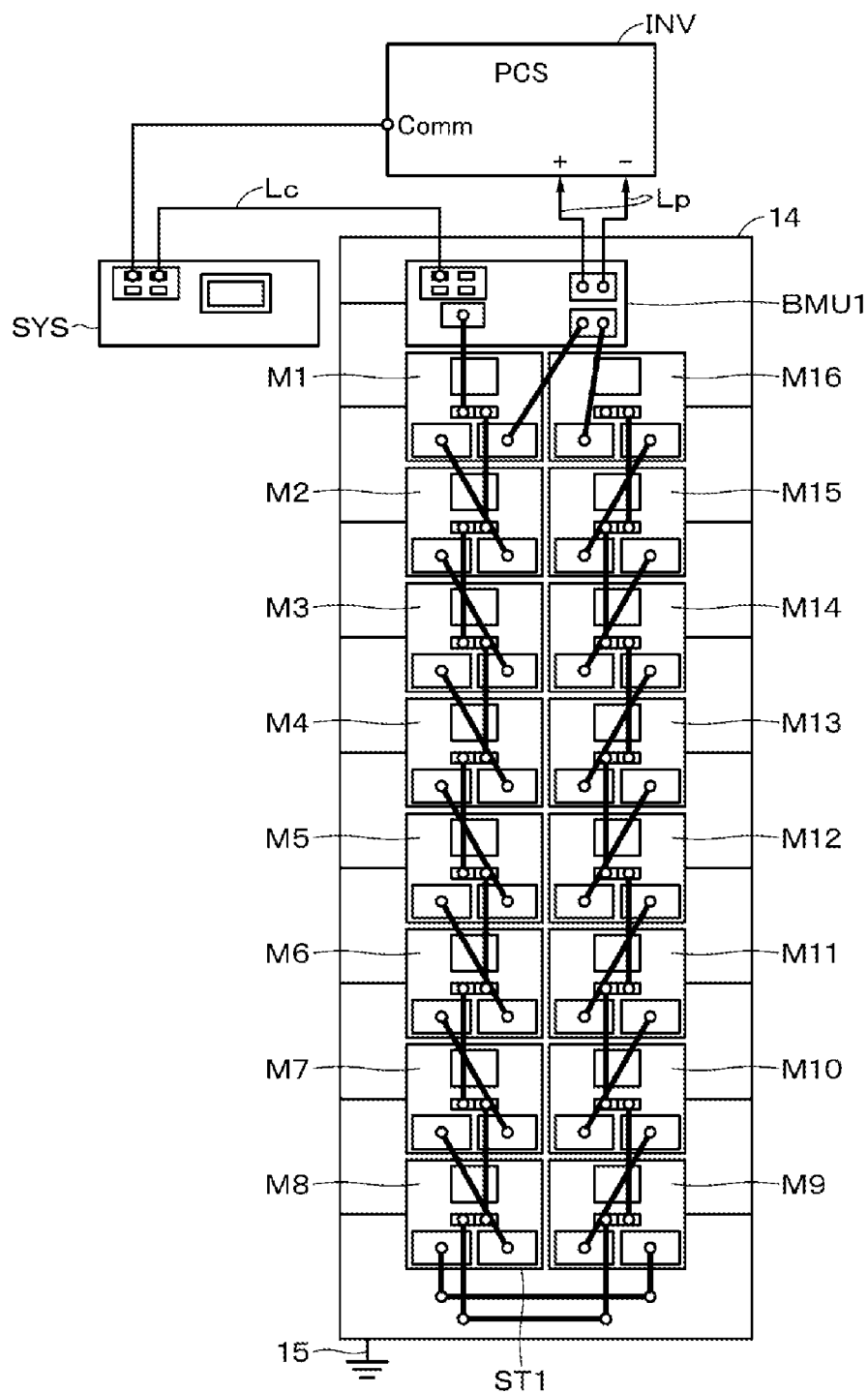
FIG. 3 is a connection diagram showing a connection of an electricity storage module in a string for explaining a conventional configuration.

FIG. 3 shows a conventional configuration example relating to the string ST 1. The other strings ST2 to ST14 have the same configuration as that of the string ST1. The grounded portions of the electricity storage modules M 1 to M 16 are electrically connected to the shelf board of the battery rack 14. A grounding wire 15 of the battery rack 14 is connected to the container 11. The container 11 is connected to ground via the grounding means 13 as described above.

The electricity storage modules M1 to M16 are connected in series, and the + side and the − side of the series connection are connected to the battery management unit BMU. The battery management unit BMU and the AC/DC converter INV are connected to each other via the DC power wiring Lp. Further, the communication terminals of the electricity storage modules M1 to M16 are sequentially connected and connected to the communication terminal of the battery management unit BMU. The battery management unit BMU and the system controller SYS are connected to each other via the communication wiring Lc. Note that FIG. 3 omits the illustration of the concentrator HUB for collecting the communication wiring Lc of a plurality of strings.

In the above-described conventional container type electricity storage system, the grounded portion of the electricity storage module M is connected to ground via the battery rack 14 and the container 11. In such a configuration, there is a possibility that a floating capacitance is formed between the grounded portion of the electricity storage module M and ground, and there is a possibility of causing an electric shock when the electricity storage module M is accidentally touched. Furthermore, noise generated by the AC/DC converter INV or the like propagates from the DC power wiring Lp to the communication wiring Lc or may propagate to a control unit such as the battery management unit BMU of the electricity storage module M via grounding wiring to affect a control operation.

An embodiment of the present technology which solves these problems will be described with reference to FIGS. 4, 5, and 6. FIG. 4 shows the interior of the container type electricity storage system having the container 11 divided into two parts by a longitudinal division line. There is a passage of a width that allows a person to walk in the center of the container type electricity storage system, and the configuration shown in FIG. 4A and the configuration shown in FIG. 4B face each other across this passage.

The strings ST1 to ST7 are provided on the side shown in FIG. 4A, and the strings ST8 to ST14 are provided on the opposite side shown in FIG. 4B. One string ST has a configuration in which the battery management unit BMU and (2×8=16) electricity storage modules M are housed in a conductive battery rack. The plurality of battery racks can be mechanically connected to each other, but are electrically insulated from each other. The AC/DC converter INV, the DC input/output board 12, and the like are housed in the container 11.

A wiring duct is provided on the ceiling portion of the container 11. DC power wiring Lp, the communication wiring Lc, and the like are passed through this wiring duct. The distances between the direct current power wiring Lp and the communication wiring Lc are made as large as possible so that noise on the direct current power wiring Lp does not jump into the communication wiring Lc.

The respective grounded portions of the AC/DC converter INV and the DC input/output board 12 are connected to ground outside the container 11. The container 11 is not grounded. However, the container 11 may be grounded so that the grounded portions of the AC/DC converter INV and the DC input/output board 12 are connected to the container 11. Furthermore, the battery rack 14 is insulated from the container 11 and further insulated from other adjacent battery racks 14. The battery rack 14 can be insulated by using an insulating plate, an insulating sheet, or the like.

Figure 5:
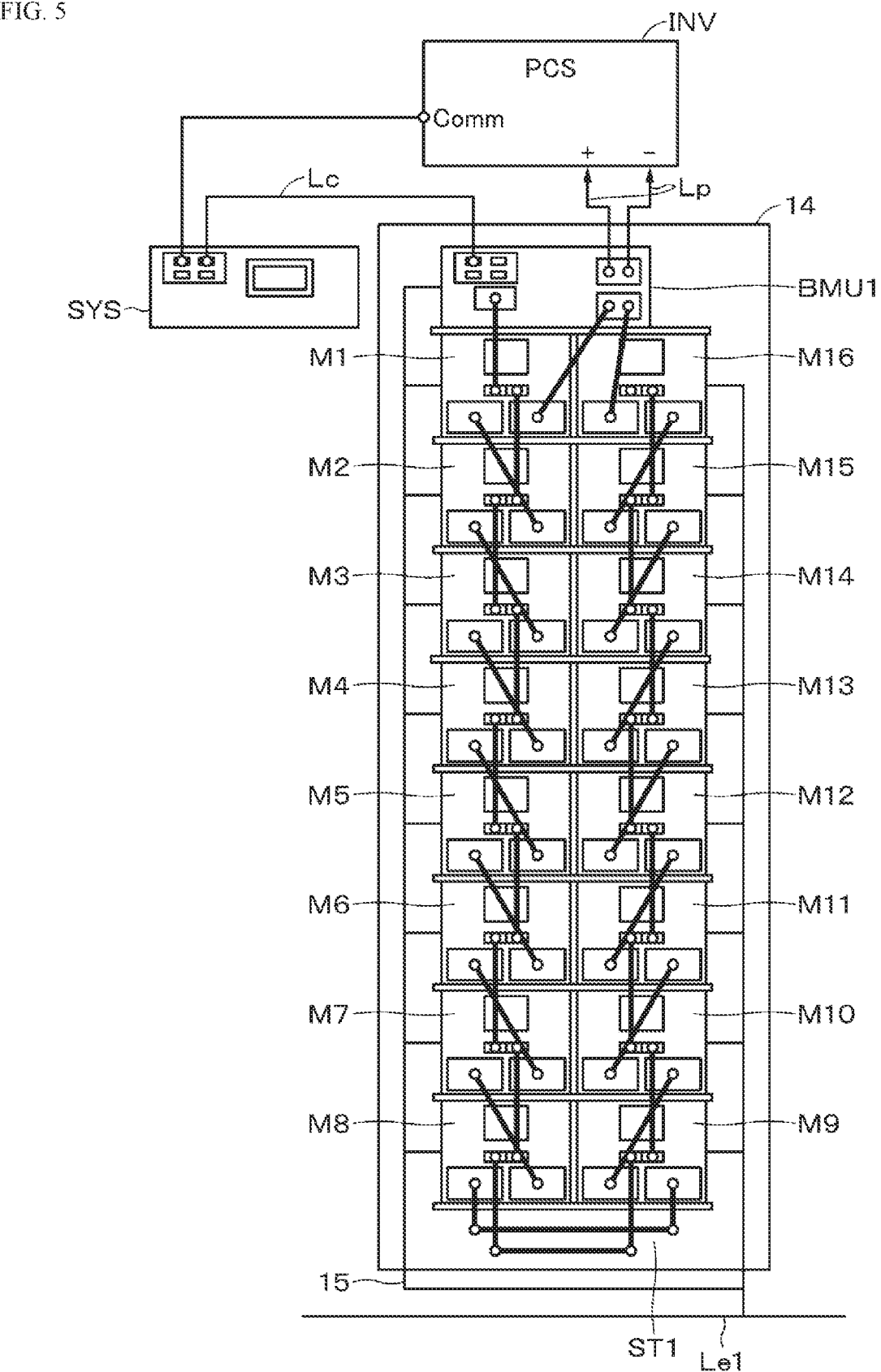
FIG. 5 is a connection diagram showing a connection of an electricity storage module in a string according to an embodiment of the present technology.

FIG. 5 shows the string ST1. The other strings ST2 to ST14 have the same configuration as that of the string ST1. The electricity storage module M of each string ST is placed on the shelf board of the battery rack and the grounded portions of the electricity storage modules M1 to M16 are electrically connected to the shelf board. The sixteen shelf boards of the battery rack 14 are connected to a ground wire Le1.

As shown in FIG. 4A, ground wires Le1 to Le7 led out from the strings ST1 to ST7 extend to a grounding box 21a and are converted into one ground wire LE1 in the grounding box 21a. As shown in FIG. 4B, ground wires Le8 to Le14 led out from each of the strings ST8 to ST14 extend to a grounding box 21b, and are converted into one ground wire LE2 in the grounding box 21b.

Figure 6:
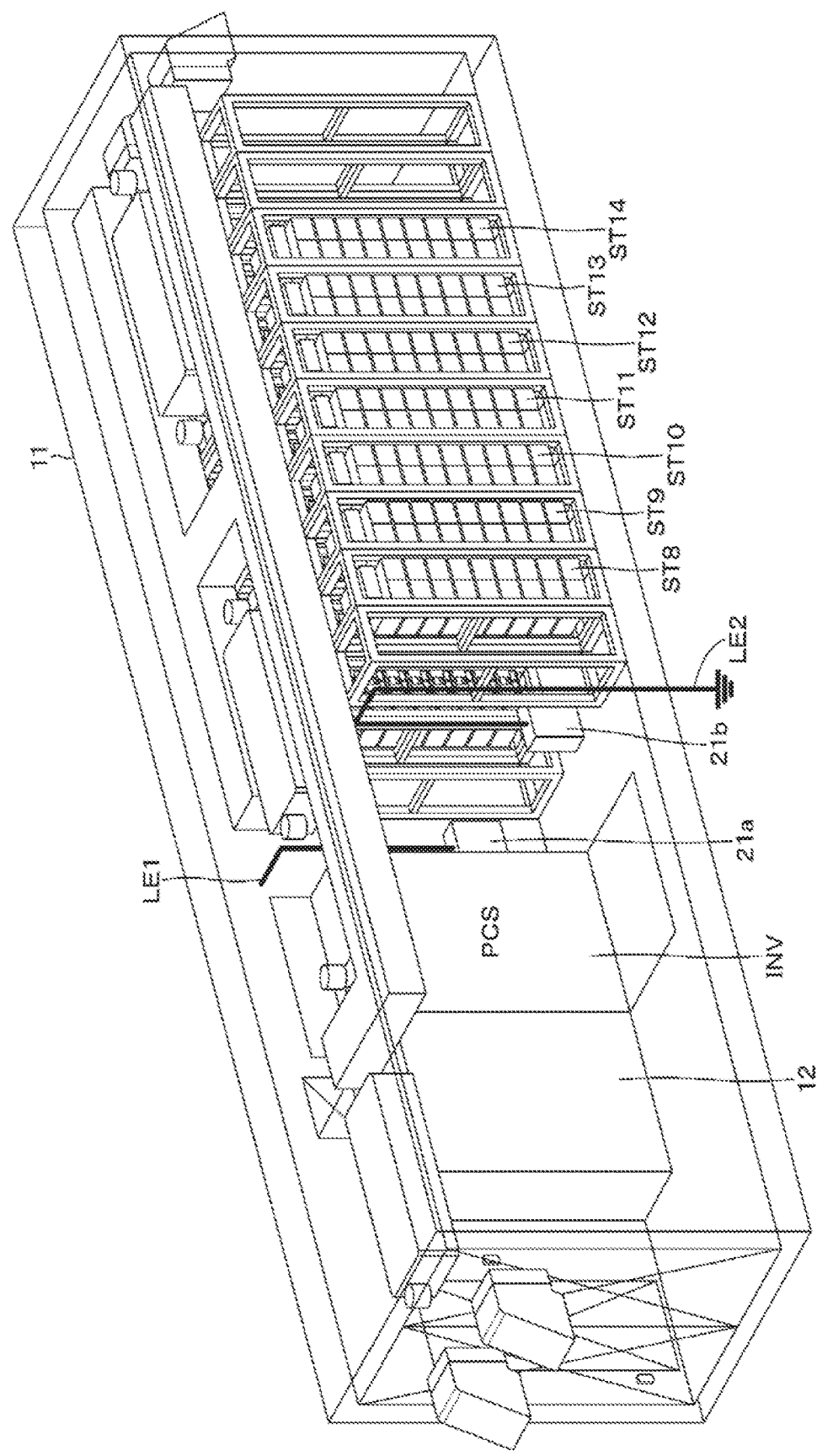
FIG. 6 is a schematic perspective view of the inner configuration of a container according to an embodiment of the present technology.

As shown in FIG. 6, the ground wires LE1 and LE2 are led out to the outside of the container 11 and connected to ground outside the container 11. Accordingly, the grounded portions of the battery rack 14, the AC/DC converter INV, and the DC input/output board 12 are commonly connected to ground (same potential) outside the container.

The electricity storage modules M1 to M16 are connected in series, and the + side and the − side of the series connection are connected to the battery management unit BMU. The battery management unit BMU and the AC/DC converter INV are connected to each other via the DC power wiring Lp. Further, the communication terminals of the electricity storage modules M1 to M16 are sequentially connected and connected to the communication terminal of the battery management unit BMU. The battery management unit BMU and the system controller SYS are connected to each other via the communication wiring Lc. Note that FIG. 3 omits the illustration of the concentrator HUB for collecting the communication wiring Lc of a plurality of strings.

In one embodiment of the present technology described above, the container 11 and the battery rack 14 are insulated from each other, and ground outside the battery rack 14 and the container 11 is connected to ground outside the container 11 via the ground wires Le1 to Le14 and the ground wires LE1 and LE2. Accordingly, because it is possible to perform grounding independently of the AC/DC converter INV that is a noise source, it is possible to prevent noise from propagating to the electricity storage module M via ground, thereby preventing the noise from affecting control communication to cause malfunction. In particular, providing the ground wire Le independently for each string can suppress the propagation of noise between strings. In addition, because the grounded portion of the electricity storage module M is connected to ground outside the container 11 via the battery rack 14, it is possible to prevent floating capacitance from occurring and to prevent an electric shock even if a user mistakenly touches the storage module.

Figure 7:
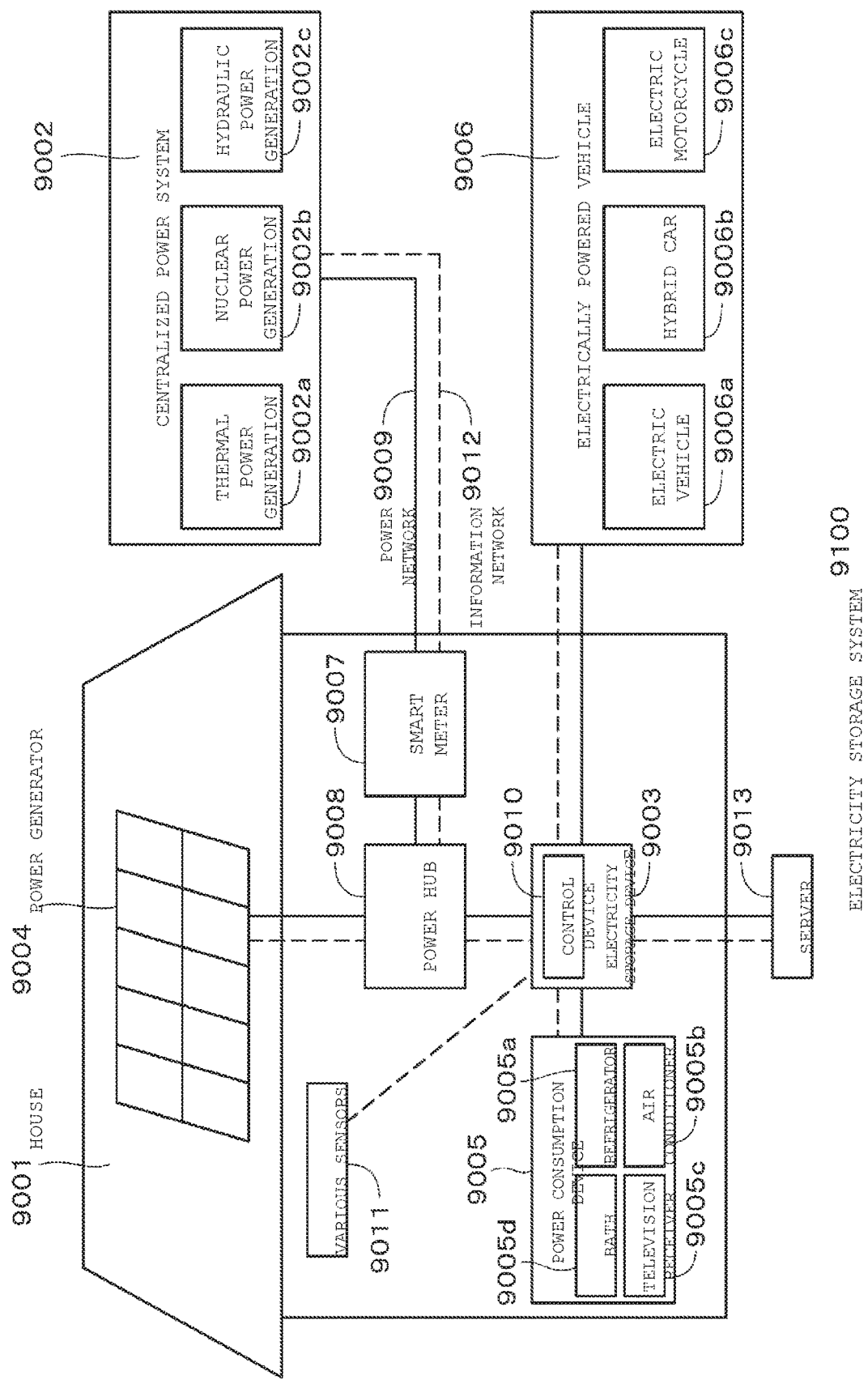
FIG. 7 is a schematic diagram showing an electricity storage system for a residential home to which the present technology is applied.

An example in which the present technology is applied to an electricity storage system for a house will be described with reference to FIG. 7. For example, in an electricity storage system 9100 for a house 9001, power is supplied from a centralized power system 9002 such as thermal power generation 9002a, nuclear power generation 9002b, or hydraulic power generation 9002c to an electricity storage device 9003 via a power network 9009, an information network 9012, a smart meter 9007, a power hub 9008, and the like. At the same time, power is supplied from an independent power supply such as a household power generator 9004 to the electricity storage device 9003. The power supplied to the electricity storage device 9003 is stored. The power to be used in the house 9001 is supplied using the electricity storage device 9003. A similar electricity storage system can be used not only for the house 9001 but also for a building.

The house 9001 is provided with the power generator 9004, a power consumption device 9005, the electricity storage device 9003, a control device 9010 for controlling each device, the smart meter 9007, and sensors 9011 for acquiring various types of information. The respective devices are connected via the power network 9009 and an information network 9012. A solar battery, a fuel cell, or the like is used as the power generator 9004, and the generated power is supplied to the power consumption device 9005 and/or the electricity storage device 9003. The power consumption device 9005 includes a refrigerator 9005a, an air conditioner 9005b, a television receiver 9005c, and a bath 9005d. Furthermore, the power consumption device 9005 includes an electrically powered vehicle 9006. The electrically powered vehicle 9006 includes an electric vehicle 9006a, a hybrid car 9006b, and an electric motorcycle 9006c.

The above-described battery unit according to the present technology is applied to the electricity storage device 9003. The electricity storage device 9003 is formed from a secondary battery or a capacitor. For example, the electricity storage device 9003 is formed from a lithium-ion battery. The lithium ion battery may be stationary or may be used in the electrically powered vehicle 9006. The smart meter 9007 has a function of measuring the usage amount of commercial power and transmitting the measured usage amount to the power company. The power network 9009 may use any one or a combination of DC power feed, AC power feed, and non-contact power feed.

The various sensors 9011 include, for example, a human sensor, an illuminance sensor, an object detection sensor, a power consumption sensor, a vibration sensor, a contact sensor, a temperature sensor, and an infrared sensor. The information acquired by the various sensors 9011 is transmitted to the control device 9010. Based on the information from the sensors 9011, the control device 9010 can grasp the state of the weather, the state of a person and the like and minimize energy consumption by automatically controlling the power consumption device 9005. Further, the control device 9010 can transmit information on the house 9001 to an external power company or the like via the Internet.

The power hub 9008 performs processing such as branching of power lines and DC-AC conversion. Communication methods of the information network 9012 connected to the control device 9010 include a method using a communication interface such as a universal asynchronous receiver-transmitter (UART) and a method using a sensor network based on a wireless communication standard such as Bluetooth (registered trademark), ZigBee (registered trademark), or Wi-Fi. The Bluetooth (registered trademark) system is applied to multimedia communication and can perform one-to-many connection communication. ZigBee (registered trademark) uses the physical layer of the institute of electrical and electronics engineers (IEEE) 802.15.4. IEEE 802.15.4 is the name of a short-range wireless network standard called personal area network (PAN) or wireless (W) PAN.

The control device 9010 is connected to an external server 9013. The server 9013 may be managed by any of the house 9001, a power company, and a service provider. The information transmitted and received by the server 9013 includes, for example, power consumption information, life pattern information, power rate, weather information, natural disaster information, and power trade information. These pieces of information may be transmitted and received from a power consuming device (for example, a television receiver) in the home, but may be transmitted and received from a device outside the home (for example, a cellular phone). These pieces of information may be displayed on a device having a display function, for example, a television receiver, a cellular phone, or personal digital assistants (PDA).

The control device 9010 that controls each unit is formed from a central processing unit (CPU), a random access memory (RAM), a read only memory (ROM), and the like, and is accommodated in the electricity storage device 9003 in this example. The control device 9010 is connected to the power storage device 9003, the household power generator 9004, the power consumption device 9005, the various types of sensors 9011, and the server 9013 via the information network 9012, and has, for example, a function of adjusting the usage amount of commercial power and the power generation amount. In addition, the control device 9010 may have, for example, a function of conducting power trading on the power market.

As described above, the electricity storage device 9003 can store not only the power generated by the centralized power system 9002 such as the thermal power generation 9002a, the nuclear power generation 9002b, or the hydraulic power generation 9002c, but also the power generated by the household power generator 9004 (solar power generation and wind power generation). Therefore, even if the power generated by the household power generator 9004 fluctuates, it is possible to perform control so as to make the amount of power sent to the outside constant or discharge as necessary. For example, the power storage device 9003 can be used in the following manner. The power obtained by photovoltaic power generation is stored in the power storage device 9003. At night, low-rate midnight power is stored in the power storage device 9003. The power stored in the power storage device 9003 is discharged and used in the daytime which is the time zone during which the electricity rate is high.

Note that although in this case, the description has been given with respect to the example in which the control device 9010 is accommodated in the electricity storage device 9003, the control device 9010 may be accommodated in the smart meter 9007 or may be formed independently. Furthermore, the electricity storage system 9100 may be used for a plurality of homes in an apartment house, or may be used for a plurality of detached houses.

An example of the electricity storage system 9100 to which the technique according to the present technology can be applied has been described above. The technique according to the present technology can be suitably applied to the electricity storage device 9003 in the above-described configuration. However, because this technology supplies DC power, it is necessary to convert DC power to AC power for supply to household AC equipment.

Although one embodiment of the present technique has been specifically described above, the present technique is not limited to the one embodiment described above, and various modifications based on the technical idea of the present technique are possible. For example, while the battery units 7 are connected in series and in parallel, they may be connected only in series or in parallel. In addition, the configurations, methods, processes, shapes, materials, numerical values and the like mentioned in the above embodiments are merely examples, and if necessary, different configurations, methods, processes, shapes, materials, numerical values, and the like may be used.

The present technology is described below in a further detail according to an embodiment.

(1) A power supply apparatus including a container made of a conductive material, a battery rack made of a conductive material housed in the container and insulated from the container, a plurality of electricity storage modules mounted on the battery rack and having grounded portions connected to the battery rack, and a grounding means for connecting the battery rack to ground outside the container.

(2) The power supply apparatus according to (1), the plurality of battery racks is disposed in the container, and insulation is ensured between housings of the battery racks and between the racks and the container.

(3) The power supply apparatus according to (1) or (2), wherein a ground wire for connection to ground outside the container is led out from each of the plurality of battery racks.

(4) The power supply apparatus according to any one of (1) to (3), wherein an AC/DC converter is housed in the container, and a grounded portion of the AC/DC converter is connected to ground outside the container.

(5) The power supply apparatus according to any one of (1) to (4), wherein a ground wire for connection to ground outside the container is led out from each of the plurality of battery racks, and a grounded portion of the AC/DC converter is different from grounded portions of the plurality of battery racks.

(6) The power supply apparatus according to any one of (1) to (5), wherein an input/output board is housed in the container, and a grounded portion of the input/output board is connected to ground outside the container.

(7) The power supply apparatus according to any one of (1) to (6), wherein a power line led out from the AC/DC converter is led out to the outside via a duct.

(8) The power supply apparatus according to any one of (1) to (7), wherein a power load is leveled by monitoring the power load.

(9) The power supply apparatus according to any one of (1) to (8), wherein at a time of a power failure, a system power is separated, and power is supplied to the load.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A power supply apparatus comprising:
   a container including a first conductive material;
   a plurality of battery racks including a second conductive material;
   a plurality of electricity storage modules mounted on the battery racks and having grounded portions connected to the battery racks; and
   a plurality of first ground wires each configured to connect a corresponding battery rack,
   wherein the first ground wires are converted to a second ground wire by a grounding box and connect to a ground outside the container through the second ground wire,
   wherein the plurality of battery racks are disposed in the container, and the plurality of battery racks are insulated from each other and are insulated from the container,
   wherein an AC/DC converter is housed in the container, and a grounded portion of the AC/DC converter is connected to the ground outside the container, and
   wherein the grounded portion of the AC/DC converter is different from grounded portions of the second ground wire and the AC/DC converter is not connected to the ground outside the container via the second ground wire.

2. The power supply apparatus according to claim 1, wherein
   an input/output board is housed in the container, and
   a grounded portion of the input/output board is connected to the ground outside the container.

3. The power supply apparatus according to claim 1, wherein a power line from the AC/DC converter is led out to outside via a duct.

4. The power supply apparatus according to claim 1, wherein a power load is leveled by monitoring the power load.

5. The power supply apparatus according to claim 1, wherein the power supply apparatus is configured to supply power to a load.

* * * * *